(12) United States Patent
Chang

(10) Patent No.: US 6,511,770 B2
(45) Date of Patent: Jan. 28, 2003

(54) BATTERY CASING WITH AN EJECTOR

(76) Inventor: Kang-Chao Chang, No. 814, Pei-Kang Rd., Chiayi City (TW)

( * ) Notice: Subject to any disclaimer, the term of this patent is extended or adjusted under 35 U.S.C. 154(b) by 181 days.

(21) Appl. No.: 09/738,053

(22) Filed: Dec. 14, 2000

(65) Prior Publication Data

US 2002/0076607 A1 Jun. 20, 2002

(51) Int. Cl.⁷ .................................................. H01M 2/10
(52) U.S. Cl. .......................... 429/100; 429/96; 429/99
(58) Field of Search ............................ 429/96, 99, 100, 429/97

(56) References Cited

U.S. PATENT DOCUMENTS 5,039,580 A * 8/1991 Mori et al. ................ 429/99 X
5,882,816 A * 3/1999 Gotou .................... 429/100 X
5,922,489 A * 7/1999 Adachi ........................ 429/100

* cited by examiner

Primary Examiner—John S. Maples

(57) ABSTRACT

A battery casing includes a battery seat, a hinged cover and an ejector member. The hinged cover is mounted pivotally to the battery seat for pivoting about a horizontal pivot axis so as to be movable between open and closed positions. The ejector member has a first end portion extending into the battery chamber, and a second end portion opposite to the first end portion and extending out of the battery chamber. The second end portion of the ejector member engages the side wall of the hinged cover. When the hinged cover is moved to an open position, the second end portion of the ejector member moves with the side wall of the hinged cover so as to cause corresponding upward movement of the first end portion of the ejector member away from the base wall, thereby enabling the ejector member to eject the battery from the battery chamber.

13 Claims, 7 Drawing Sheets

BATTERY CASING WITH AN EJECTOR

BACKGROUND OF THE INVENTION

1. Field of the Invention

The present invention relates to a battery casing, more particularly to a battery casing provided with an ejector member to facilitate removal of a battery set therefrom for replacement purposes.

2. Description of the Related Art

A battery casing is commonly found in electrical appliances, and is formed with a battery chamber for receiving a battery set therein. To ensure stable electrical connection between battery contacts of the casing and contact terminals of the battery set, the battery chamber is typically designed to have a size corresponding to that of the battery set so as to prevent undesired movement of the battery set within the battery chamber. As such, little space is available in the battery chamber for extension of fingers of a person thereinto when removing the battery set from the battery chamber for replacement purposes. A tool might be needed to remove the battery set. This problem is not uncommon in conventional battery casings.

SUMMARY OF THE INVENTION

Therefore, the main object of the present invention is to provide a battery casing having an ejector member to facilitate removal of a battery set therefrom for replacement purposes.

Accordingly, the battery casing of the present invention includes a battery seat, a hinged cover and an ejector member. The battery seat has a base wall and a surrounding wall unit which extends upwardly from the base wall and which cooperates with the base wall to confine a battery chamber that is adapted for receiving at least one battery and that has a top opening. The surrounding wall unit includes a front wall. The hinged cover has a top wall and a side wall extending downwardly from the top wall. The side wall has a lower hinge end portion which is disposed adjacent to the front wall of the surrounding wall unit and externally of the battery chamber, and which is mounted pivotally to the battery seat for pivoting about a horizontal pivot axis so as to be movable between a closed position, in which the top wall moves to the top opening of the battery chamber for covering the top opening, and an open position, in which the top wall moves away from the battery chamber to uncover the top opening and permit access to the battery chamber. The ejector member is disposed on the front wall of the surrounding wall unit of the battery seat. The ejector member has a first end portion extending into the battery chamber, and a second end portion opposite to the first end portion and extending out of the battery chamber. The second end portion of the ejector member engages the side wall of the hinged cover. When the hinged cover is at the closed position, the first end portion is disposed horizontally on the base wall of the battery seat and is adapted to be disposed below the battery. When the hinged cover is moved to the open position, the second end portion of the ejector member moves with the side wall of the hinged cover so as to cause corresponding upward movement of the first end portion of the ejector member away from the base wall, thereby enabling the ejector member to eject the battery from the battery chamber.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
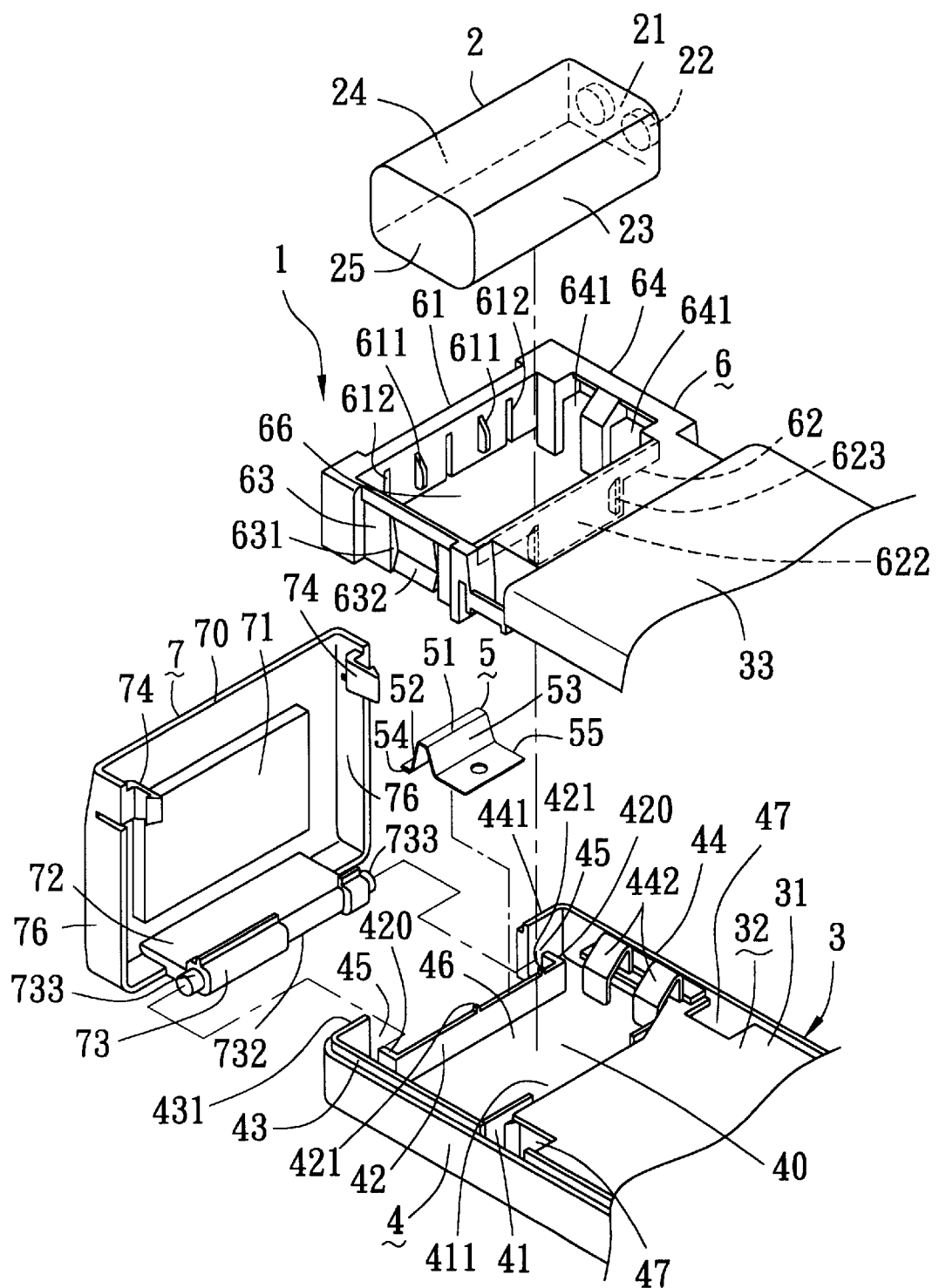
FIG. 1 is an exploded perspective view of a first preferred embodiment of the battery casing of the present invention, with a battery received therein and with the battery casing incorporated in an electrical appliance.

Before the present invention is described in greater detail, it should be noted that like elements are denoted by the same reference numerals throughout the disclosure.

Figure 2:
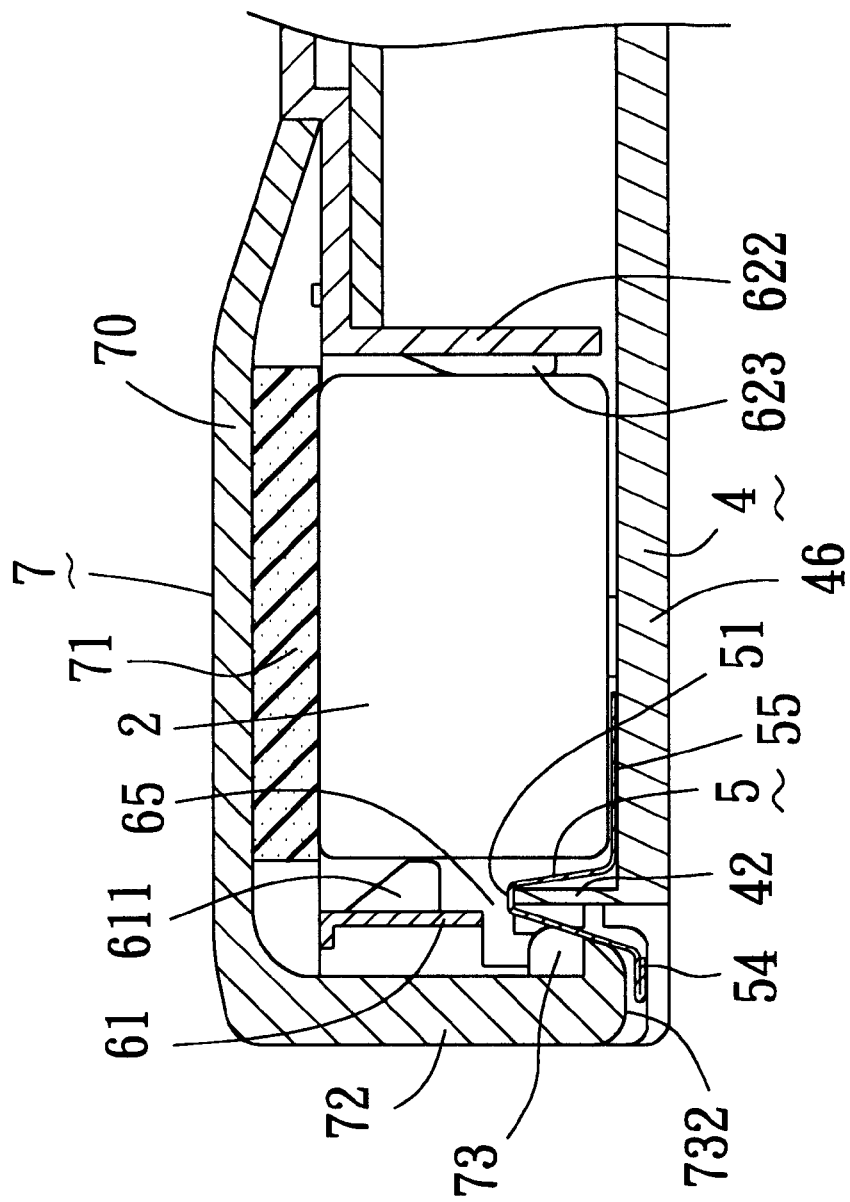
FIG. 2 is a sectional view of the first preferred embodiment, where a cover is at a closed position.

Referring to FIGS. 1 and 2, the first preferred embodiment of the battery casing of the present invention is illustrated to be embodied in a wireless transmitter 3 which has a main body 32 provided with an electric circuit board 31. The battery casing 1 of the preferred embodiment is provided at an end portion of the main body 32, and is adapted for receiving a battery 2 having a pair of contact terminals 22 at a right end face 21 thereof.

The battery casing 1 of the first preferred embodiment is shown to include a battery seat 4, a hinged cover 7, and an ejector member 5.

The battery seat 4 includes a horizontal base wall 46, a surrounding wall unit which includes parallel front and rear walls 42, 41 and parallel left and right walls 43, 44 and which extends upwardly from the base wall 46, a battery chamber 40 confined by the base wall 46 and the surrounding wall unit, and a looped frame 6 superimposed on the surrounding wall unit. The left and right walls 43, 44 have front end portions which are bent inwardly toward each other to form a pair of wing portions 431, 441. The front wall 42 is indented relative to the wing portions 431, 441, and has opposite ends 420 that are bent forwardly toward the wing portions 431, 441, thereby forming an aligned pair of hinge spaces 45 adjacent to the wing portions 431, 441. The front wall 42 further has an upper edge formed with a pair of retaining protrusions 421 which are spaced-apart along length of the upper edge. The rear wall 41 is discontinuous to form an insert space 411 at an intermediate section thereof. The right wall 44 is provided with a pair of battery contacts 442 adapted to be in electrical contact with the contact terminals 22 of the battery 2.

Figure 3:
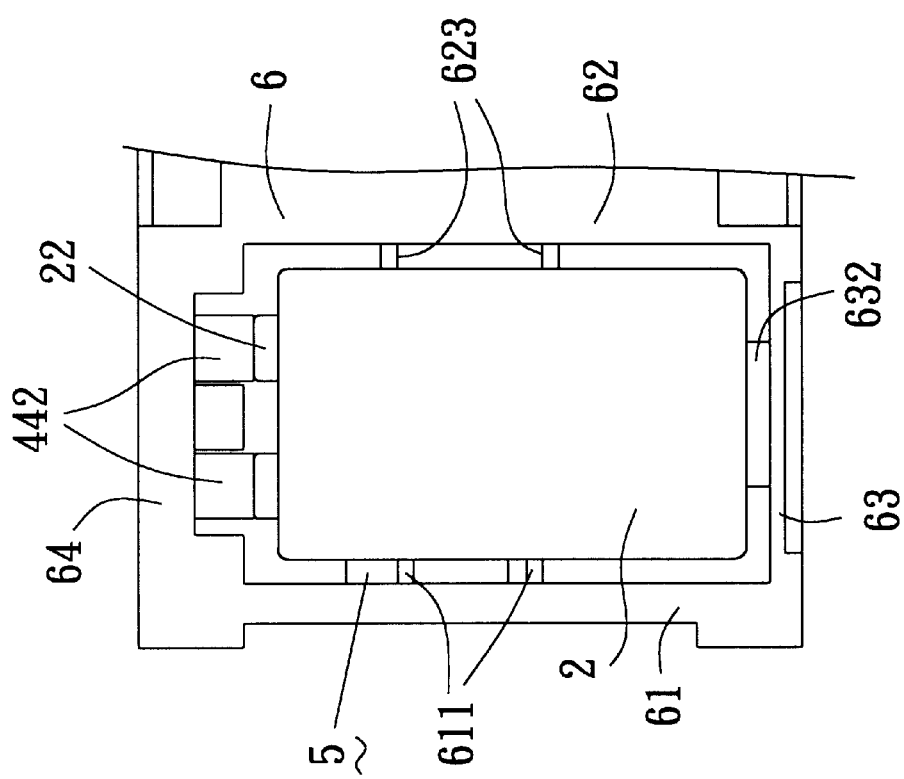
FIG. 3 is a schematic top view of the first preferred embodiment, with the cover removed therefrom.

With further reference to FIG. 3, the looped frame 6 is rectangular in shape, and includes parallel front and rear frame portions 61, 62, and parallel left and right frame portions 63, 64 which cooperatively define a top opening 66 of the battery chamber 40. The rear frame 62 is connected to a cap 33 that covers the electric circuit board 31 of the transmitter 3, and is formed with an insert plate 622 which extends downwardly into the insert space 411 in the rear wall 41 of the surrounding wall unit. The insert plate 622 is formed with two abutment projections 623 which project into the battery chamber 40 and which is adapted to abut resiliently against a rear side face 23 of the battery 2. The left and right frame portions 63, 64 are disposed respectively on the left and right walls 43, 44 of the surrounding wall unit. The left frame portion 63 is formed with a parallel pair of slits 631 which extend vertically from a lower edge of the left frame portion 63 so as to define a resilient plate 632 therebetween. The resilient plate 632 is bent and projects into the battery chamber 40 so as to be adapted to abut against a left end face 25 of the battery 2. The right frame portion 64 is formed with a pair of grooves 641 which are aligned respectively with the battery contacts 442 and which permit passage of the pair of contact terminals 22 of the battery 2 therethrough. The front frame portion 61 is formed with three parallel slits 612 which extend upwardly from a lower edge thereof and which are displaced from one another, and a pair of abutment projections 611 among the slits 612. The abutment projections 611 project into the battery chamber 40 so as to be adapted to abut against a front side face 24 of the battery 2. The front frame portion 61 is misaligned with the front wall 42 of the surrounding wall unit, and is disposed forwardly relative to the front wall 42. As lot 65 is formed between a lower edge of the front frame portion 61 and the upper edge of the front wall 42.

The hinged cover 7 includes a rectangular top wall 70, left and right side walls 76 and a front side wall 72 which extend downwardly and respectively from left and right edges and a front edge of the top wall 70. The front side wall 72 has a lower hinge end portion 73 which includes a pair of aligned pivot shafts 733 that extend respectively into the hinge spaces 45 in the battery seat 4 for mounting pivotally the cover 7 on the battery seat 4. The hinged cover 7 is thus pivotable about a horizontal pivot axis that passes through the pivot shafts 733, and is movable between a closed position, in which the top wall 70 moves to the top opening 66 of the battery chamber 40 for covering the top opening 66, and an open position, in which the top wall 70 moves away from the top opening 66 to uncover the top opening 66 and permit access to the battery chamber 40. The hinge end portion 73 has a recessed section 732 that extends in a direction parallel to the pivot axis. The top wall 70 has a bottom side which faces the battery chamber 40 and which is provided with a resilient pad 71 adapted to contact the battery 2 to help position the battery 2 in the battery chamber 40. Each of the left and right side walls 76 is formed with a hook projection 74 which is extendible into a corresponding engaging hole 47 in the battery seat 4 for retaining releasably the hinged cover 7 at the closed position.

The ejector member 5 is formed as a bent plate which extends through the slot 65 and which is disposed on the upper edge of the front wall 42 between the retaining protrusions 421. The ejector member 5 includes a first end portion 55 which extends into the battery chamber 40, a second end portion 54 opposite to the first end portion 55 and extending out of the battery chamber 40, and a bridging portion 51 which interconnects the first and second end portions 54, 55 and which straddles over the front wall 42 of the battery seat 4. The bridging portion 51 is generally inverted U-shaped in cross-section, and has a pair of inclined portions 53, 52 disposed on two sides of the front wall 42 and connected respectively to the first and second end portions 55, 54. The second end portion 54 of the ejector member 5 is disposed below the hinge end portion 73 of the hinged cover 7, and extends into the recessed section 732.

In assembly, the ejector member 5 is disposed on the front wall 42 of the surrounding wall unit for straddling over the same. Thereafter, the pivot shafts 733 of the hinge end portion 73 of the hinged cover 7 are extended into the hinge spaces 45, and the cover 7 is disposed in an open state. The looped frame 6 is then superimposed on the surrounding wall unit and is secured to the same for retaining the hinge end portion 73 of the hinged cover 7 at the battery seat 4.

In use, the hinged cover 7 is turned to uncover the top opening 66 so as to permit the battery 2 to be disposed in the battery chamber 40 such that the first end portion 55 of the ejector member 5 is disposed immediately below the battery 2. The hinged cover 7 is then turned to the closed position. At this time, the resilient projections 623, 611, the resilient plate 632 on the looped frame 6 and the resilient pad 71 abut resiliently against the battery 2 to arrest movement of the battery 2 within the battery chamber 40 such that stable electrical contact between the battery 2 and the battery seat 4 can be ensured even when the transmitter 3 is being carried by the user.

Figure 4:
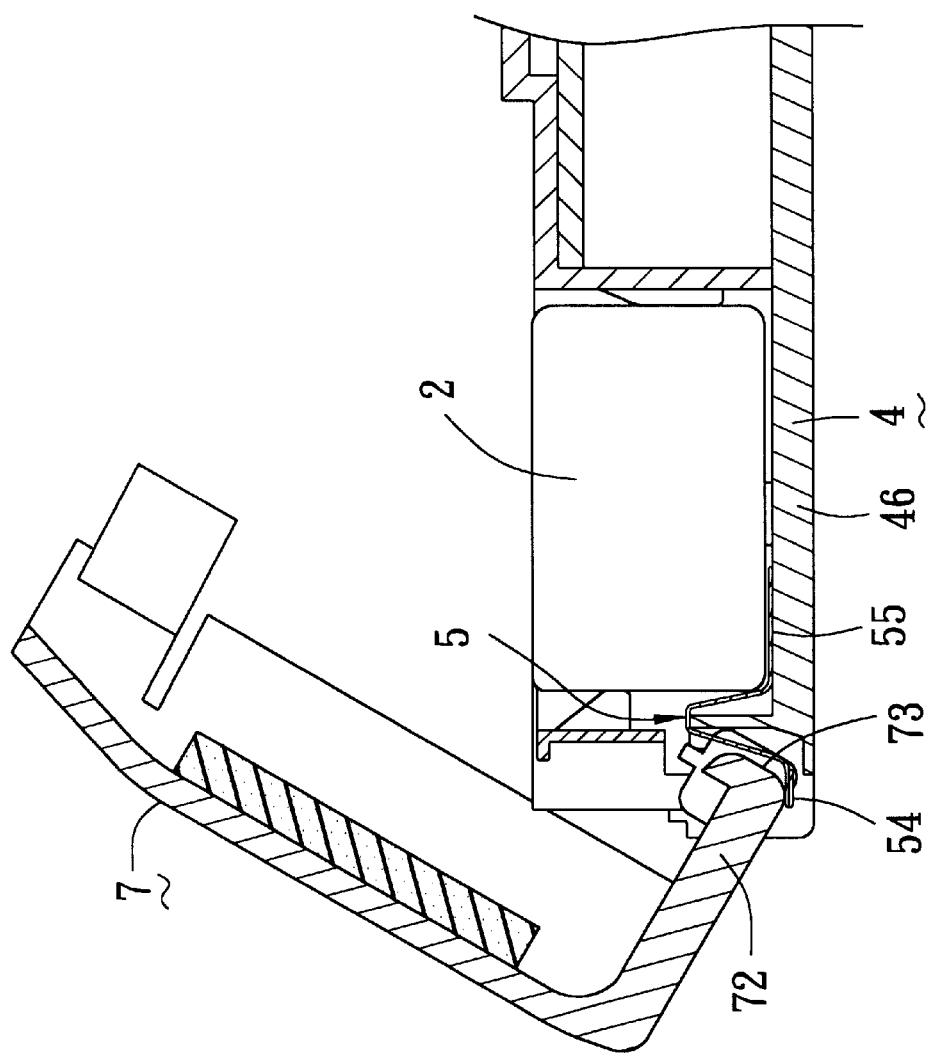
FIG. 4 is another sectional view of the first preferred embodiment to illustrate movement of the cover to an open position.
Figure 5:
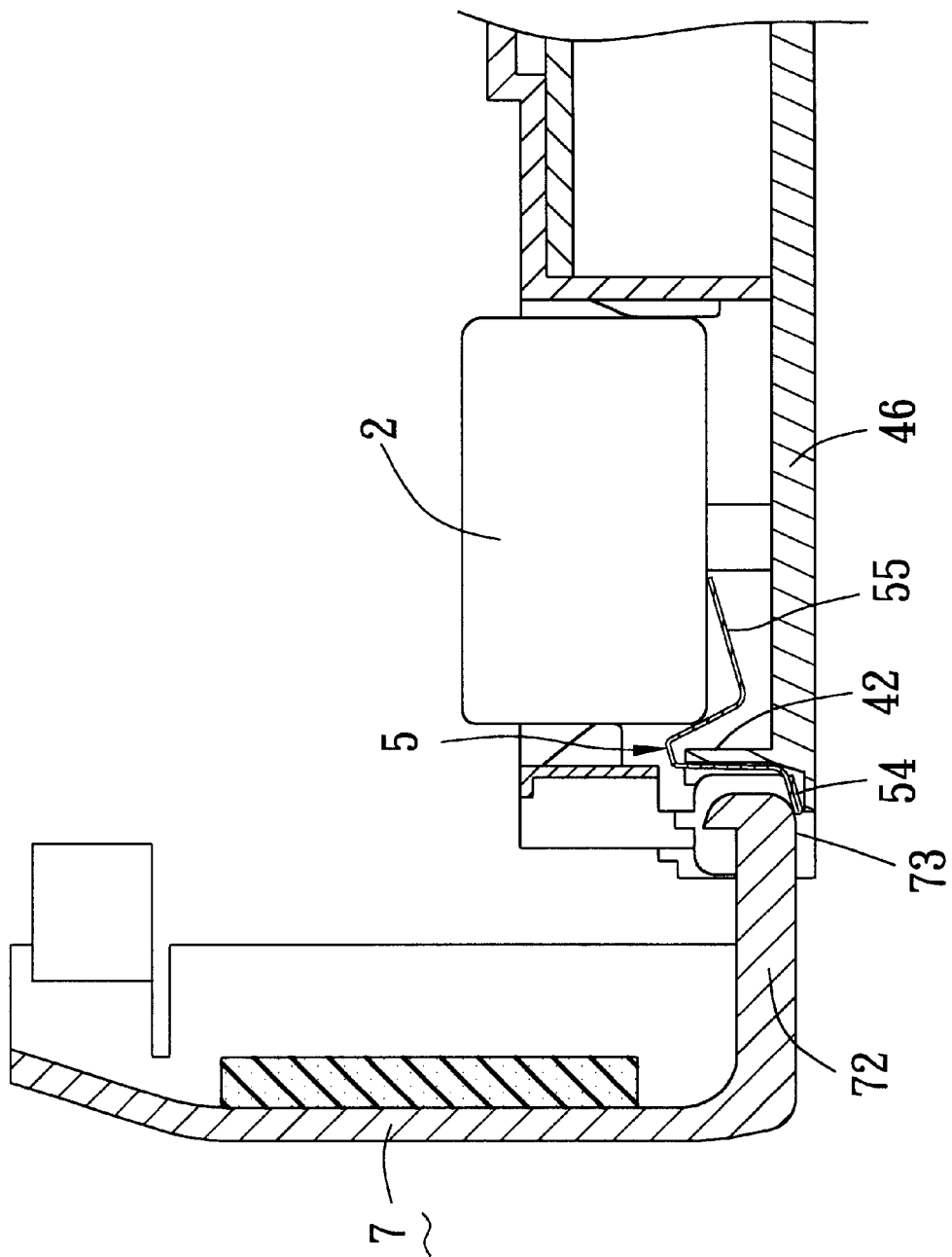
FIG. 5 is still another sectional view of the first preferred embodiment when the cover is at the open position.

Referring to FIG. 2, when the hinged cover 7 is in the closed state, the first end portion 55 of the ejector member 5 is disposed horizontally on the base wall 46 and below the battery 2. The second end portion 54 of the ejector member 5 extends into the recessed section 732, and is disposed below the hinged end portion 73 and is spaced therefrom in a vertical direction. When it is desired to remove the battery 2, such as for the purpose of replacement, the hinged cover 7 is turned to the open position, as shown in FIGS. 4 and 5. At this time, the second end portion 54 of the ejector member 5 is depressed by the hinge end portion 73 of the hinged cover 7 and turns downwardly with respect to the upper edge of the front wall 42, thereby causing corresponding upward turning of the first end portion 55 away from the base wall 46 of the battery seat 4. The battery 2 can thus be pushed upwardly by the first end portion 55 of the ejector member 5 for ejecting from the battery seat 4 to facilitate removal of the battery 2 from the battery chamber 40. When a new battery is subsequently received in the battery chamber 40, the first end portion 55 of the ejector member 5 can be depressed by the new battery to enable upward turning of the second end portion 54 so as to cause the hinged cover 7 to turn in an opposite direction for moving to the state shown in FIG. 4.

Figure 6:
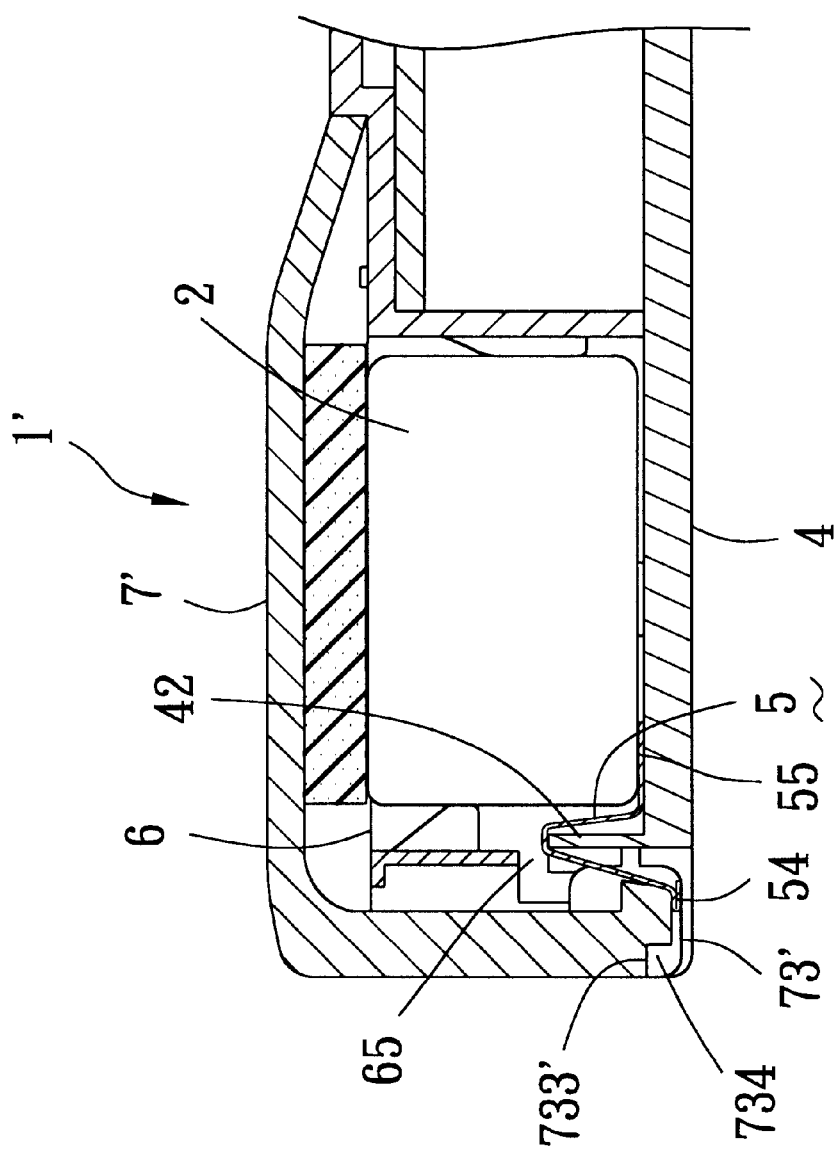
FIG. 6 is a sectional view of a second preferred embodiment of the battery casing according to the present invention, where a cover is shown to be at a closed position.
Figure 7:
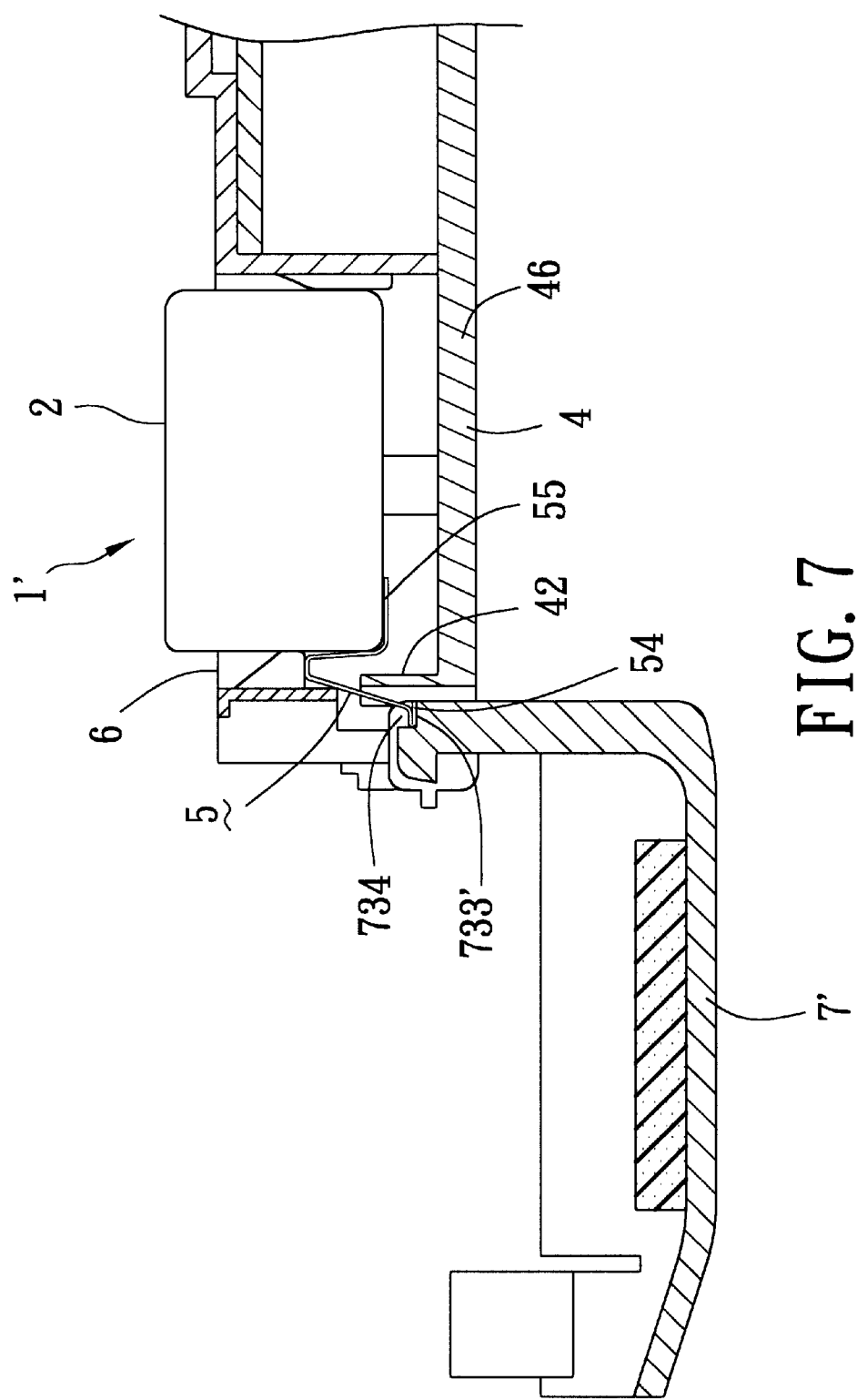
FIG. 7 is still another sectional view of the second preferred embodiment, where the cover is shown to be at an open position.

Referring to FIGS. 6 and 7, the second preferred embodiment of the battery casing 1' of this invention is shown to also include a battery seat 4 with a looped frame 6, a hinged cover 7' and an ejector member 5. The battery casing 1' of the second preferred embodiment is different from the previous embodiment in that the hinge end portion 73' is further formed with a cavity 734 which has a flat abutment wall 733' formed therein. When the hinged cover 7' moves to the open position, the second end portion 54 of the ejector member 5 extends into the cavity 734 and abuts against the abutment wall 733' so as to be pushed upwardly by the abutment wall 733'. The entire ejector member 5 is thus moved upwardly relative to the front wall 42 of the battery seat 4, thereby raising the first end portion 55 away from the base wall 46 of the battery seat 4. The slot 65 has a width which is measured between the lower edge of the front frame portion of the looped frame 6 and the upper edge of the front wall 42 and which is sufficient to permit upward movement of the ejector member 5 therein. It is noted that the hinged cover 7' can be turned by a larger angle, as compared to that in the previous embodiment, for actuating the second end portion 54 of the ejector member 5. This further facilitates replacement of the battery by the user.

It should be noted that, when two or more batteries are received in the battery chamber 40, the ejector member 5 can be designed to eject only one of the batteries from the battery chamber 40. The remaining batteries can be removed with ease thereafter.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A battery casing comprising:

a battery seat having a base wall and a surrounding wall unit which extends upwardly from said base wall and which cooperates with said base wall to confine a battery chamber that is adapted for receiving at least one battery and that has a top opening, said surrounding wall unit including a front wall;

a hinged cover having a top wall and a side wall extending downwardly from said top wall, said side wall having a lower hinge end portion which is disposed adjacent to said front wall of said surrounding wall unit and externally of said battery chamber, and which is mounted pivotally to said battery seat for pivoting about a horizontal pivot axis so as to be movable between a closed position, in which said top wall moves to said top opening of said battery chamber for covering said top opening, and an open position, in which said top wall moves away from said battery chamber to uncover said top opening and permit access to said battery chamber; and an ejector member disposed on said front wall of said surrounding wall unit of said battery seat, said ejector member having a first end portion extending into said battery chamber, and a second end portion opposite to said first end portion and extending out of said battery chamber, said second end portion of said ejector member engaging said side wall of said hinged cover;

said first end portion of said ejector member being disposed horizontally on said base wall of said battery seat and being adapted to be disposed below the battery when said hinged cover is at the closed position;

said second end portion of said ejector member moving with said side wall of said hinged cover so as to cause corresponding upward movement of said first end portion of said ejector member away from said base wall, thereby enabling said ejector member to eject the battery from said battery chamber when said hinged cover is moved to the open position.

2. The battery casing according to claim 1, wherein said ejector member is formed as a bent plate, and further has a bridging portion interconnecting said first and second end portions, said bridging portion being generally inverted U-shaped in cross-section and straddling over said front wall of said surrounding wall unit.

3. The battery casing according to claim 2, wherein said front wall has an upper edge formed with two retaining protrusions which are spaced-apart from each other along length of said upper edge, said bridging portion of said ejector member being disposed between said retaining protrusions.

4. The battery casing according to claim 2, wherein said second end portion of said ejector member is depressible by said hinge end portion of said side wall of said hinged cover and turns downwardly when said hinged cover moves to the open position, thereby causing said first end portion of said ejector member to turn upwardly for moving away from said base wall.

5. The battery casing according to claim 4, wherein said hinge end portion of said hinged cover has a recessed section, said second end portion of said ejector member extending into said recessed section of said hinged end portion for engaging said hinge end portion.

6. The battery casing according to claim 4, wherein said battery seat further includes a looped frame superimposed on said surrounding wall unit to define said top opening, said looped frame being provided with resilient abutment means adapted to abut against the battery to arrest movement of the battery in the battery chamber.

7. The battery casing according to claim 6, wherein said looped frame includes a front frame portion which cooperates with said front wall of said surrounding wall unit to define a slot therebetween, said ejector member extending through said slot.

8. The battery casing according to claim 7, wherein said front frame portion is misaligned with said front wall in a vertical direction.

9. The battery casing according to claim 2, wherein said second end portion of said ejector member is pushed upwardly by said hinge end portion of said hinged cover when said hinged cover moves to the open position, thereby moving said ejector member upwardly and raising said first end portion of said ejector member away from said base wall of said battery seat.

10. The battery casing according to claim 9, wherein said battery seat further includes a looped frame superimposed on said surrounding wall unit to define said top opening, said looped frame being provided with resilient abutment means adapted to abut against the battery to arrest movement of the battery in the battery chamber.

11. The battery casing according to claim 10, wherein said looped frame includes a front frame portion which cooperates with said front wall of said surrounding wall unit to define a slot therebetween, said ejector member extending through said slot.

12. The battery casing according to claim 11, wherein said front frame portion is misaligned with said front wall in a vertical direction, said slot having a size sufficient to permit upward movement of said ejector member therein when said hinged cover is moved to the open position.

13. The battery casing according to claim 9, wherein said hinged end portion of said hinged cover has a cavity and an abutment wall formed in said cavity, said second end portion of said ejector member extending into said cavity and being pushed by said abutment wall when said hinged cover is moved to the open position.

* * * * *